April 22, 1958     G. L. GOUGH     2,832,023
MODULAR TAPE CONTROL SYSTEM

Filed July 19, 1956     2 Sheets-Sheet 1

INVENTOR
GEORGE L. GOUGH
BY Emery Robinson
ATTORNEY

INVENTOR
GEORGE L. GOUGH
BY Emery Robinson
ATTORNEY

United States Patent Office 2,832,023
Patented Apr. 22, 1958

2,832,023

MODULAR TAPE CONTROL SYSTEM

George L. Gough, Glenview, Ill., assignor to Teletype Corporation, Chicago, Ill., a corporation of Delaware Application July 19, 1956, Serial No. 598,874

6 Claims. (Cl. 318—162)

This invention relates to positioning mechanisms and more particularly to improved mechanisms for positioning the movable elements of a machine tool.

An object of this invention is to provide a simple apparatus for positioning the movable elements of a machine tool in accordance with coded indicia in a programmed tape.

Another object is to provide an inexpensive device for automatic control of a machine tool.

Still another object of this invention is to provide a control element for a machine tool which may be programmed and operated using standard printing telegraph equipment.

Another object is to provide a modular control system which may be utilized with any standard type reversible motor for driving the movable elements of a machine tool.

In the past, it has been necessary to undertake rather extensive programming to control a machine tool. Because of the complexity of the programming required, the devices were suitable only for long runs and were not practical for job shop or small lot runs. The present invention using a mnemonic type of code is very simply programmed and is thus suitable for all types of jobs where the modular unit provides sufficient accuracy.

Yet another object of the present invention is to provide a small size control unit which can be used with varying modules.

These and other objects will be apparent from the following description when read in conjunction with the drawings wherein.

According to the present invention the program tape is prepared using a code which consists of five mnemonic symbols. Since only five symbols are used, the code symbol can be designated in each of the five lateral positions of a standard five unit code.

The five single marking indicia in the standard Baudot code are "E," Line Feed, Space, Carriage Return, and "T," which are each represented by one of five marking positions in the tape.

The foregoing functions and letter indicia have been assigned a symbol representative of a control command instead of the standard representations. The five commands are: "S" (Stop reader), "V" (Condition the vertical control circuit), "G" (Energize the conditioned motor), "—" (Reverse direction of motors), and "C" (Modular unit to be registered on counter). Each time that an indicium appears in an assigned lateral position in the tape one of the above-designated commands is given to perform the desired operation of the work table and control device.

The control circuits are normally positioned to operate in the positive "X" direction hence the "V" code serves to condition the unit to operate in the "Y" axis and the "—" code serves to condition the motor circuits for operation in a negative direction.

Figures 1, 3:
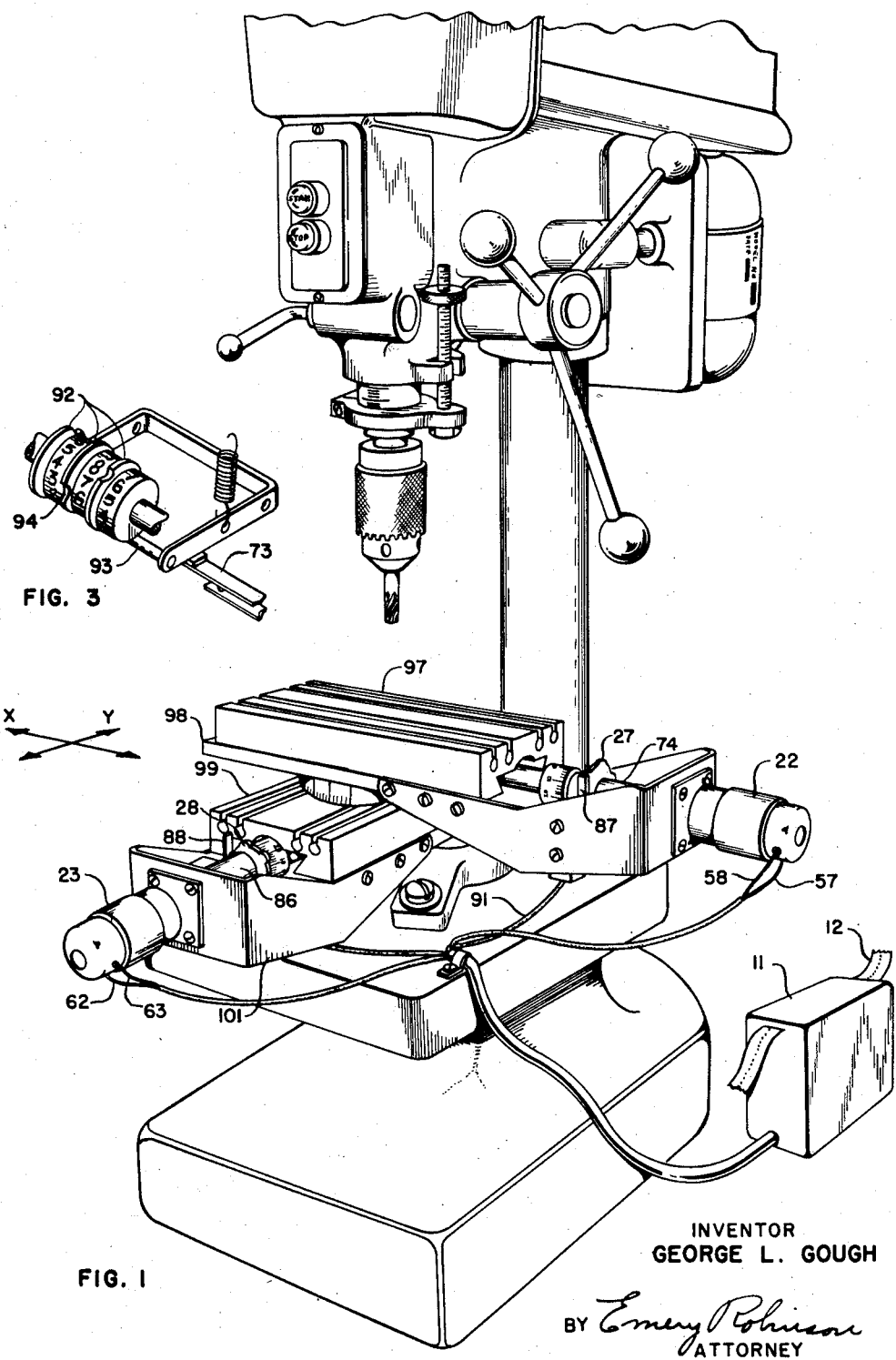
Fig. 1 is a perspective of a machine tool with the work table and traversing motors connected for automatic operation.
Fig. 3 is a detail drawing of the counter disk.

Referring first to Fig. 1, a machine tool is illustrated with the present invention in place. A tape reader 11 is shown sensing a programmed tape 12 and transferring the sensed commands through a composite cable to the traversing mechanism of the machine tool.

A horizontal or "X" axis table 97 is slidably mounted in a frame 98 so as to be movable along the "X" axis by rotation of a shaft or lead screw 74 which is adapted to be driven by a motor 22. A cam 27 is mounted to rotate with the shaft 74 to close a contact 87 (see also Fig. 2) each time the shaft 74 has turned a predetermined amount. As will be explained later, the intermittent closing of the contact 87 sends a pulse through the conductor 91 back to a counter (not shown in Fig. 1).

The frame 98 is slidably mounted on a "Y" axis table 99 which is in turn slidably mounted in a suitably mounted frame 101 and is adapted to be moved along the "Y" axis by a motor 23 which is controlled by the reader 11.

Figure 2:
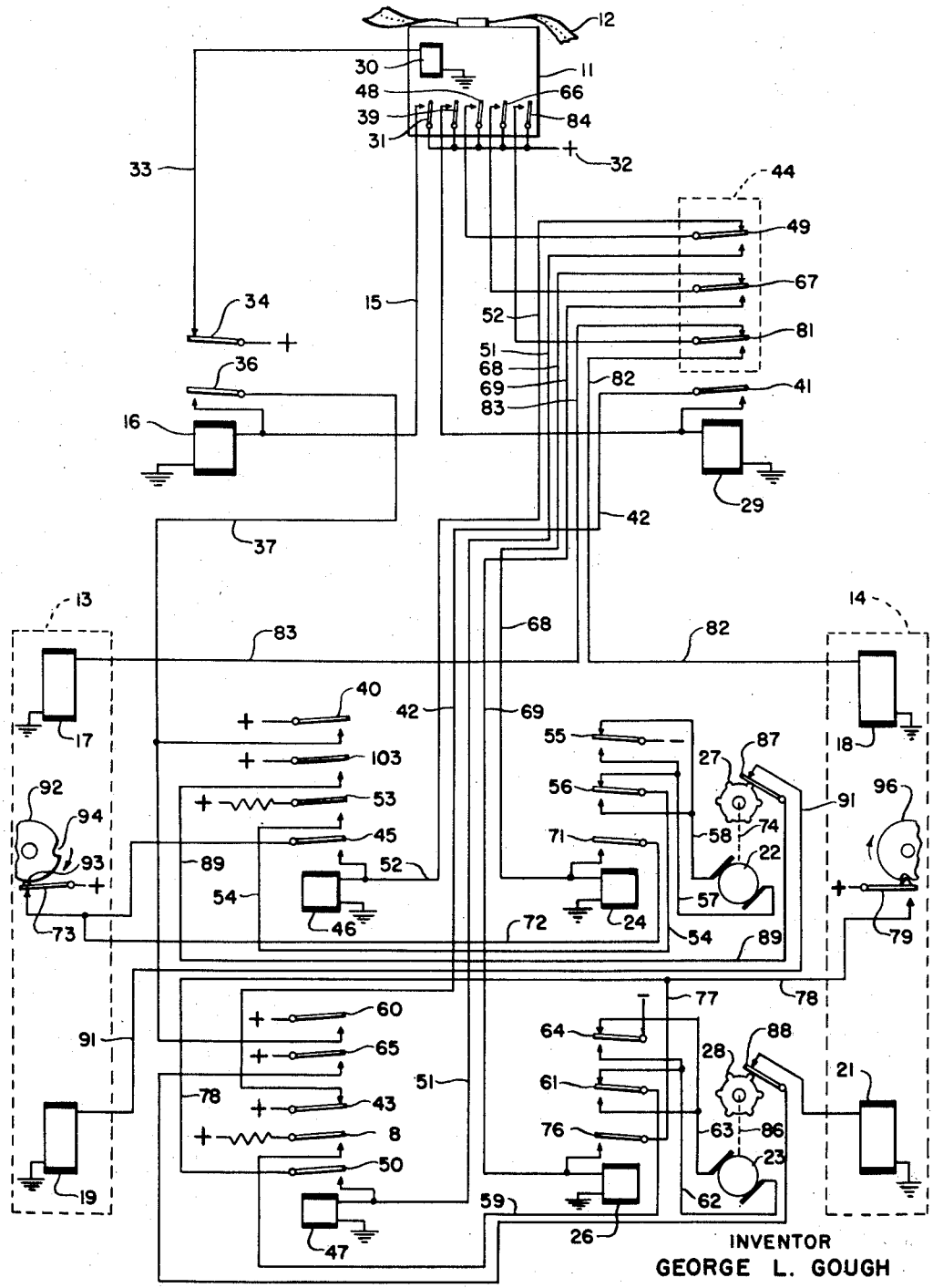
Fig. 2 is a circuit diagram showing the present invention diagrammatically.

Referring now to Fig. 2, a programmed tape 12 is shown in a tape reader 11. The relays shown diagrammatically in Fig. 2 are controlled by the reader 11 sensing the indicia in the tape 12 in the usual manner which is well known in the printing telegraph art. The horizontal and vertical or "X" and "Y" axis positioning mechanisms are driven by the motors 22 and 23 which are controlled by the relay circuits which are actuated in response to the indicia sensed by the reader 11. A pair of counters 13 and 14 associated with the "X" and "Y" motors 22 and 23, respectively, are wire to be advanced in accordance with the number of "C" commands in the tape and returned in accordance with the number of pulses produced in a pulsing circuit by the projections on the counting cam 27 and a similar cam 28 which are driven by the traversing motors 22 and 23 thereby recording the distance traveled by each traversing mechanism.

The tape reader 11 may be of any type such as that described in the United States Patent No. 2,296,845, issued September 29, 1942, to Mr. M. T. Goetz. In such readers, a clutch magnet 30 (the magnet 72 of the patent), when energized will cause the tape 12 to be advanced one step and will sense the area of the tape presented to a plurality of sensing pins such as shown in the above-mentioned patent. When the reader 11 senses a perforation at the first level (E in the Baudot code), it will close a contact 31 to apply positive battery from a source 32 through a conductor 15 to a reader clutch control relay 16. Energization of the relay 16 causes its break contact 34 to open, thereby de-energizing the reader clutch magnet 30. Holding battery for the relay 16 is supplied through its make contact 36, a conductor 37 and a make contact 40 or a make contact 60 of a start control relay 46 or a start control relay 47, respectively. The relay 16 is therefore dependent upon either one of the start control relays 46 or 47 for its holding current for reasons which will be apparent as the operation is explained.

The vertical or "Y" axis traversing mechanism is controlled through a relay 29 which is energized by the reader 11 sensing indicia in the second lateral position in the tape to close a contact 39 which supplies positive battery from the source 32 to the relay 29. The relay 29 gets its holding battery through its contact 41, a conductor 42 and a normally closed contact 43 of relay 47. In considering the vertical control circuit, it will be noted that the relay 29 controls a bank of transfer contacts 44, each of which is normally in its upper position (Fig. 2) to condition the "X" axis traversing mechanism control circuits for operation without the necessity of any initial "X" axis control signal.

The motor control circuit is activated by the reader 11 sensing indicia in the third lateral position in the tape which closes a contact 48 to supply positive battery from the source 32 through a transfer contact 49 in the contact bank 44 and either of two conductors 51 or 52 to either of the relays 46 or 47, depending upon whether or not the "V" code has been received to energize the "Y" axis control relay 29.

If the "Y" axis control relay 29 is in its de-energized condition, the motor 22, which drives the table 97 along the "X" axis, will be supplied with operating current over a path from negative battery source at a contact 55 of relay 24, through a conductor 58 to the motor 22 and thence over a conductor 57 and through a transfer contact 56 associated with the relay 24, through a conductor 54, to a make contact 53 of the relay 46 and through a resistance to the positive battery source associated with contact 53. If, on the other hand, the "Y" axis control relay 29 is operated, motor 23 will be supplied with current in a path from negative battery source connected to a contact 64 of relay 26 over a conductor 63, through the motor 23 and a conductor 62 to the break contact associated with a transfer contact 61 of relay 26, thence over a conductor 69 to a make contact 8 and thence to the positive battery source through a resistor. The motors 22 and 23, of course, will only be operated when their associated relays 46 or 47, respectively, are energized.

If it is desired to position the tool in the minus quadrant, the tape is prepared with indicia in the fourth lateral position. When the reader 11 senses a perforation in the fourth lateral position a contact 66 is closed in the reader 11 to complete a circuit from the source of positive battery 32 through a transfer contact 67, associated with relay 29, either of two conductors 68 or 69 to a relay 24 or relay 26 again depending upon whether or not the "V" code has been sensed by the reader 11. If the "V" code is not in control, i. e. transfer relay 29 is not energized, the reversing relay 24 is energized and gets locking battery through its make contact 71, a conductor 72 and a cam operated contact 73 in the "X" counter 13. Energization of the reverse relay 24 draws up the transfer contacts 55 and 56 to reverse the flow of current through the motor 22 to thereby reverse the rotation of the shaft 74 to operate the "X" axis traversing mechanism to the left or in a negative direction. Similarly, if the "V" code is in control, i. e. transfer relay 29 is energized, the relay 26 is energized and locked up through its make contact 76, a pair of conductors 77 and 78 and a cam operated contact 79 in the "Y" axis counter 14.

The "X" and "Y" counters 13 and 14 are set to the desired number of modular units by the number of indicia which occupy the fifth lateral position in the tape 12. Either the "X" or "Y" counter is selectively conditioned to receive the pulses under control of the tape 12 depending on whether or not the relay 29 is energized. Each time the reader 11 senses a perforation in the fifth lateral position of the tape it will cause a contact 84 to be closed and a pulse will be transmitted from the source of positive battery 32 through the transfer contact 81 through either of two conductors 82 or 83 to either of two addition solenoids 17 or 18 of the "X" or "Y" counters 13 and 14. The closing of the contact 84 is of course of a momentary nature for each sensing period, so that one pulse will be transmitted to the counters to represent one modular unit for each perforation in the tape. The counter is thereby stepped to a number which corresponds to the number of desired modular units which had been programmed in the tape. The counter illustrated herein is of the type wherein a plurality of counter wheels 92 are utilized to register a number of pulses transmitted to the counter. The counter wheels 92 as illustrated in Fig. 3, are three in number and will register the units, tens and hundreds modular units as represented by the pulses transmitted to the magnet 17.

The counter wheels 92 have slots or notches 94 cut in them at a point where, in the zero position of all of the wheels 92, a spring pressed bail 93 will move into the aligned slots. In the position of the bail 93, where it is not moved into the aligned slots 94, the bail will hold the contacts 73 closed. Upon all of the counter wheels 92 reaching the zero position the slots 94 will be aligned and the bail 93 will be moved into the slots to permit the contact pair 73 to open.

A subtracting circuit is operated by the counter cam 27 or a similar cam 28 on the shaft 74 or a similar shaft 86. The lobes on the cams 27 and 28 are so placed that the pulsing contacts 87 and similar pulsing contacts 88 are closed at the end of each modular unit of travel of the traversing mechanism. If the "X" traversing mechanism is operating, the cam 27 closes the contact 87 at the end of each unit of travel to complete a circuit from positive battery through make contact 103 which is closed because the relay 46 had been energized by the sensing of the "G" code, a conductor 89 and the conductor 91 to a subtracting solenoid 19 to step the counter 13 toward zero.

The contact 73 in the counter 13 is closed as soon as the first modular unit is registered on the counter wheels 92 (Figs. 2 and 3) by the bail 93 being cammed out of the zero slot 94. As is more clearly shown in Fig. 3, the zero contacts 73 and 79 are held closed as long as there is any counter wheel 92 which is not at zero.

It is of course understood that while a mechanical counter is shown by way of illustration, other types of counters such as electronic counters may be utilized without departing from the scope of this invention. If electronic counters are used, the zero contact will, of course, be operated in a manner which is more suitable to the type of counter used such as vacuum tubes in series or any other suitable means to close the circuit when the counter is not at zero.

The "Y" counter is similarly controlled by the counter wheels represented by the disk 96 in Fig. 2.

In order to better illustrate the operation of the present invention it will be assumed that it is desired to traverse the work table eight modular units to the right or in the positive direction on the "X" axis, five units in the positive direction along the "Y" axis, eight units in the negative "X" direction, and five units in the negative "Y" direction back to the starting point.

The first step in practicing the present invention is to program the movement of the work table using the assigned mnemonic symbols. The programming for the stated example consists of C8 (Count 8 on the "X" axis); G (Energize "X" axis drive motor to drive in forward direction); "V" (Condition switching circuits to apply subsequent commands to the "Y" axis); C5 (Count five on the "Y" axis counter); S (Stop reader); G (Energize the "Y" axis drive motor in forward direction); C8 (Count eight on the "X" axis counter); "—" (Condition the relay circuits to drive traversing motor in reverse direction); S (Stop reader); G( Energize the "X" axis motor to drive in reverse direction); "V" (Condition switching circuits so that subsequent commands will apply to "Y" axis mechanism); C5 (Count five on "Y" axis counter); "—" (Condition motor circuits to drive in reverse direction); S (Stop reader); and G (Energize the "Y" axis drive motor).

The second step is to have the code symbols put on the control tape. This can be done with any type of perforator for a five unit code.

After the desired indicia has been placed on the control tape 12, it is placed in the tape reader 11. The operation of the tape reader 11 to control a positioning mechanism for a machine tool can best be described by reference to the circuit diagram of Fig. 2.

The C8 has been perforated in the tape as eight sequential perforations in the fifth lateral position on the tape. When the reader 11 senses a perforation in the fifth lateral position in the tape, the contact 84 is momentarily closed to complete a pulsing circuit through the contact 81 and the conductor 83 to the addition solenoid 17 on the "X" counter 13 to thereby register by advancing the units counter wheel 92 a count representative of one modular unit for each perforation in the sequence. The first incremental advance of the wheel 92 cams the bail 93 out of its slot 94 to close the contact 73 which will remain closed until all the counter wheels 92 are returned to zero.

A single perforation in the third lateral position (G) is next sensed by the reader 11 to momentarily close the contact 48 to energize the relay 46 through the transfer contact 49 and the conductor 52. The relay 46 gets locking battery through its make contact 45 and the zero contact 73. Energization of the relay 46 closes its make contact 40 to condition a locking circuit for the reader clutch control relay 16; closes its make contact 103 to condition a pulsing circuit through the conductor 89, the normally open contact 87, and the conductor 91 to the subtraction solenoid 19 on the "X" counter 13, and closes its make contact 53 to complete an operating circuit for the "X" motor 22 from positive battery through the conductor 54, the contact 56 on the relay 24, the conductor 57, the motor 22, the conductor 58, and the transfer contact 55 on the relay 24 to negative battery. Completion of the aforementioned operating circuit starts the "X" traversing motor to thereby turn the shaft 74 in the forward feeding direction. As the traversing shaft 74 turns, the counter cam 27 turns with it. For each modular unit of travel of the table a high point on the cam causes the contact 87 to be closed to pulse the subtraction solenoid 19 on the counter 13 and thereby step the counter wheel 92 one unit toward its zero position.

A single perforation in the second lateral position of the tape represents the "Y" axis command (V). When the reader 11 senses the "V" command, the contact 39 is closed to energize the "Y" axis relay 29 to draw up the transfer contacts in the contact bank 44 and thereby condition the control circuits to operate on the "Y" axis components of the positioning mechanism. The relay 29 gets locking battery through its make contact 41, the conductor 42 and the break contact 43 on the relay 47.

The reader 11 next senses five sequential perforations in the fifth lateral position and pulses the addition solenoid 18 on the "Y" counter 14 through the transfer contact 81 and the conductor 82. As in the "X" counter the addition solenoid 18 advances the counting wheel 96 and closes the zero contact 79.

The stop reader code "S" was programmed into the tape to allow the "X" axis positioning mechanism to complete its operation before the "Y" axis mechanism takes over. Upon sensing the single perforation in the first lateral position the contact 31 is closed to energize the reader clutch control relay 16 which gets locking battery through its make contact 36, the conductor 37 and the make contact 40 on the relay 46. When the relay 16 is energized the break contact 34 is opened thereby removing positive battery from the reader clutch magnet 30 and stopping the reader 11 until the "X" axis traversing mechanism has moved the desired number of modular units. After the lobes on the counter cam 27 have closed the contact 87 eight times, the counter wheel 92 will have been returned to its zero position so that its slot 94 is opposite the bail 93 thereby allowing the bail 93 to be moved away from the normally open contact 73 to allow it to open. The opening of the contact 73 removes locking battery from the relay 46 allowing it to release. Release of the relay 46 opens the contact 53 to open the operating circuit to the "X" axis motor 22; opens the contact 103 to open the subtraction pulsing circuit; and opens the contact 40 to release the reader clutch control relay 16. Release of the relay 16 causes the break contact 34 to close thereby energizing the reader clutch magnet 30.

Upon energization of the reader clutch coil, the next code indicia, which is "G" is sensed by the reader 11 to close the contact 48 and thereby energize the relay 47 through the transfer contact 49 and the conductor 51. The relay 47 gets locking batery through its make contact 50, the conductor 78 and normally open zero contact 79 which is now closed because the counter wheel has been advanced by the addition solenoid 18. Energization of the relay 47 closes the contact 8 to complete an operating circuit for the "Y" axis motor 23 through the conductor 59, the transfer contact 61, the conductor 62, the motor 23, the conductor 63, and the transfer contact 64; opens the break contact 43 to release the relay 29 thereby restoring the transfer contacts of the contact bank 44 to their normal positions in the "X" axis control circuits; closes the make contact 65 to condition the pulsing circuit to the subtraction solenoid 21 of the "Y" axis counter 14; and closes the make contact 60 to condition a locking circuit for the reader clutch control relay 16.

A single perforation in the fourth lateral position causes the reader 11 to close the contact 66 to energize the "X" axis reverse relay 24 through the transfer contact 67 and the conductor 68. The relay 24 gets locking battery from the zero contact 73 through its make contact 71. Energization of the relay 24 pulls up the transfer contacts 55 and 56 to reverse the path of operating current through the motor 22 thereby reversing the direction of rotation of the shaft 74 to drive the table in a negative "X" direction.

A stop reader code "S" now appears in the tape to assure the completion of the "Y" axis positioning before the subsequent command is given. Sensing of the "S" code causes the relay 16 to be energized and locked up through the make contact 60 on the relay 47 to hold the reader 11 idle until the "Y" axis counter reaches zero as described above for the "X" axis counter. When the counter wheel 96 reaches its zero position, the contact 79 is allowed to open thereby releasing the relay 47 which in turn removes locking battery from the relay 16 to permit the reader 11 to sense the next indicum in the tape which is "G."

When the reader 11 senses the code "G" the relay 46 is energized and the "X" axis motor operating circuit is established as previously set forth except that the contacts on the relay 24 have been pulled up so that the flow of operating current is reversed thereby reversing the direction of the motor 22 and the shaft 74 to move the "X" axis traversing mechanism in the negative direction and operates the counter cam 27 to step the subtraction solenoid 19 to step the motor after the desired amount of advance. The detailed operation of the cut off circuit has been already described.

While the "X" axis traversing is taking place, the subsequent "Y" axis commands by sensing the code "V" to energize the relay 29 and condition the control circuits to operate on the "Y" axis mechannism. With the relay 29 operated and the subsequent "C₅" code steps the "Y" counter five units and is followed by the reverse code "—" which operates the "Y" axis reverse relay 26 so that the flow of current, when the relay 47 is operated, will be through the contact 58 on the relay 47, the conductor 59, the conductor 63, the motor 23, the conductor 62 and the contact 64.

The "S" code is now sensed in the tape to stop the reader until the "X" axis traversing has been completed. Upon completion of the "X" axis traversing, the relay 16 is released to allow the reader 11 to sense the last indicum of the series, which is the "G" to activate the "Y" axis traversing mechanism in the negative direction until it has traveled 5 modular units which brings the tool back to its starting point per the example.

While the present invention has been described in a specific embodiment, it should be understood that various changes may be made in the mechanism without departing from the spirit and scope thereof.

What is claimed is:

1. An automatic control device for a machine tool which comprises: a tape having a predetermined number of perforations in a plurality of predetermined lateral positions therein; a means for sensing the perforations in said tape; a counter; a first circuit controlled by said sensing means to advance said counter one unit from zero in response to each perforation in a first predetermined lateral position in said tape, a motor circuit adapted to be actuated by said sensing means in response to each perforation in a second predetermined lateral position in said tape; a movable work table; a shaft means operable by said motor to move said work table; a pulsing circuit actuated by each predetermined increment of rotation of said shaft means to step said counter one unit toward zero; and a circuit actuated by the return of said counter to zero for rendering said motor circuit ineffective.

2. An automatic control device for positioning the movable work table of a machine tool in response to a programmed record which comprises: a means for sensing indicia in said record; a circuit, including a digital counter, controlled by said sensing means for advancing said counter one unit from zero for each indicium in a first predetermined lateral position in said record; a motor adapted to be actuated by said sensing means in response to each indicum in a second predetermined lateral position in said record for moving said work table in a predetermined direction; a pulsing circuit operable by each predetermined increment of advance of said table to step said counter one unit toward zero; and a circuit controlled by the return of said counter to zero for rendering said motor ineffective.

3. In a system for positioning a movable work holder in a machine tool in response to a prearranged series of indicia in a tape: a tape reader for sensing the indicia in the tape; a pulsing circuit controlled by said tape reader to generate a pulse for each indicum in a first predetermined lateral position in said tape; a first counter means normally connected to said pulsing circuit to be stepped one unit from zero by each pulse; a second counter means selectively operable by said pulsing circuit to be stepped one unit from zero by each pulse; a transfer circuit actuated by said tape reader in response to indicum in a second predetermined lateral position in said tape to transfer said pulsing circuit from said first counter means to said second counter means; means controlled by said tape reader in response to preconcerted indicia in said tape for selectively traversing said work holder in one of two directions; means for returning said first counter one unit toward zero for each increment of travel of said tool holder in a first predetermnied direction; means for returning said second counter one unit toward zero for each increment of travel of said tool holder in a second predetermined direction; and means controlled by said first or second counter reaching zero for rendering said traversing means ineffective.

4. In combination, a record reader adapted to be controlled by the lateral position of indicia in a record, a movable work table, two driving means for positioning said work table along two intersecting lines, a selecting means controlled by said reader ascertaining indicia in a first predetermined lateral position in said record for selectively conditioning one of said driving means for operation, a counting means adapted to be advanced one unit in response to each indicium ascertained by said record reader in a second predetermined lateral position, a circuit adapted to be operated by said reader ascertaining indicia in a third predetermined lateral position to actuate the conditioned driving means, means actuated by each predetermined increment of advance of said driving means for stepping said counter means one unit toward zero, and means actuated by said counter means reaching zero for rendering said driving means ineffective.

5. An automatic control device for positioning the movable work table of a machine tool in response to a programmed record which comprises: a means for sensing indicia in said record; a pair of circuits, including digital counters, adaptable to be advanced by said sensing means one unit from zero in response to each indicium in a predetermined lateral position in said record; a pair of driving means each adapted to propel the work table along a line perpendicular to the line of travel of the other; a pair of pulsing circuits each operable by one of said driving means to step one of said counters one unit toward zero for each predetermined increment of advance of its affiliated driving means; transfer means controlled by said sensing means for selectively conditioning one of said counter circuits, driving means, and pulsing circuits for operation; a circuit controlled by said sensing means ascertaining a predetermined indicium in said tape for actuating the conditioned driving means; and a pair of circuits each controlled by the return of one of said counters to zero to render one of said driving means ineffective.

6. A record controlled positioning device comprising: a record reader adapted to ascertain indicia in accordance with the lateral position of the indicia in the record; a movable work table; two propelling means for moving said table along two intersecting lines, each propelling means consisting of a counting means, a motor operable when the counting means does not register zero, a lead screw operable by said motor to propel said table, and a pulsing circuit for stepping said counter toward zero in response to each predetermined increment of advance of said lead screw; means controlled by said reader in response to indicia in a first predetermined lateral position in said record for conditioning one of said propelling means for actuation; a circuit controlled by said reader for advancing the counter of the conditioned propelling means one unit from zero for each indicium in a second predetermined lateral position in said record; means for actuating the motor of the conditioned propelling means in response to indicia in a third predetermined lateral position in said record; and relay means conditioned by the operation of either of said propelling means and actuated by said reader in response to indicia in a fourth lateral position in said record for rendering said reader ineffective.

References Cited in the file of this patent
UNITED STATES PATENTS
2,438,098    Tandler et al. _____ Mar. 16, 1948